United States Patent [19]

Huber et al.

[11] Patent Number: 5,164,091

[45] Date of Patent: Nov. 17, 1992

[54] REMOVAL OF METAL IONS FROM PROCESS WASTEWATERS

[75] Inventors: Guenther Huber, Dannstadt-Schauernheim; Wolfgang Habermann, Mainz; Walter Goesele, Heidelberg; Rolf Klassen, Speyer, all of Fed. Rep. of Germany

[73] Assignee: BASF Aktiengesellschaft, Ludwigshafen, Fed. Rep. of Germany

[21] Appl. No.: 764,860

[22] Filed: Sep. 24, 1991

[30] Foreign Application Priority Data

Sep. 29, 1990 [DE] Fed. Rep. of Germany ....... 4030912

[51] Int. Cl.$^5$ ............................................... C02F 1/42
[52] U.S. Cl. .................................... 210/638; 210/748; 210/777

[58] Field of Search ............. 210/748, 777, 793, 193, 210/243, 638; 204/114, 149

[56] References Cited

U.S. PATENT DOCUMENTS 3,679,052  7/1972  Asper ................................. 210/777
4,382,866  5/1983  Johnson .............................. 210/748

*Primary Examiner*—Frank Spear
*Attorney, Agent, or Firm*—Keil & Weinkauf

[57] ABSTRACT

Metal ions are removed from process wastewaters by using an electrically conducting, cathodically polarized filter-aid layer whose potential is at least 50 mV more negative than the redox potential of the metal ions to be removed, by passing the metal ion-containing water through the filter-aid layer and periodically renewing the filter-aid layer at intervals of from 2 to 180 minutes by backwashing, classifying and precoating processes.

12 Claims, 1 Drawing Sheet

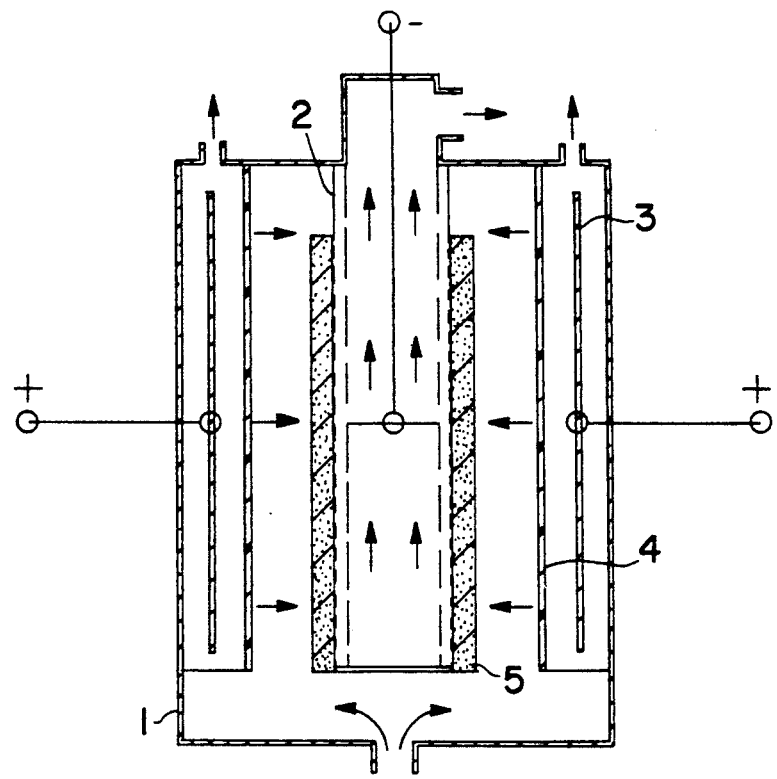
FIG. IA
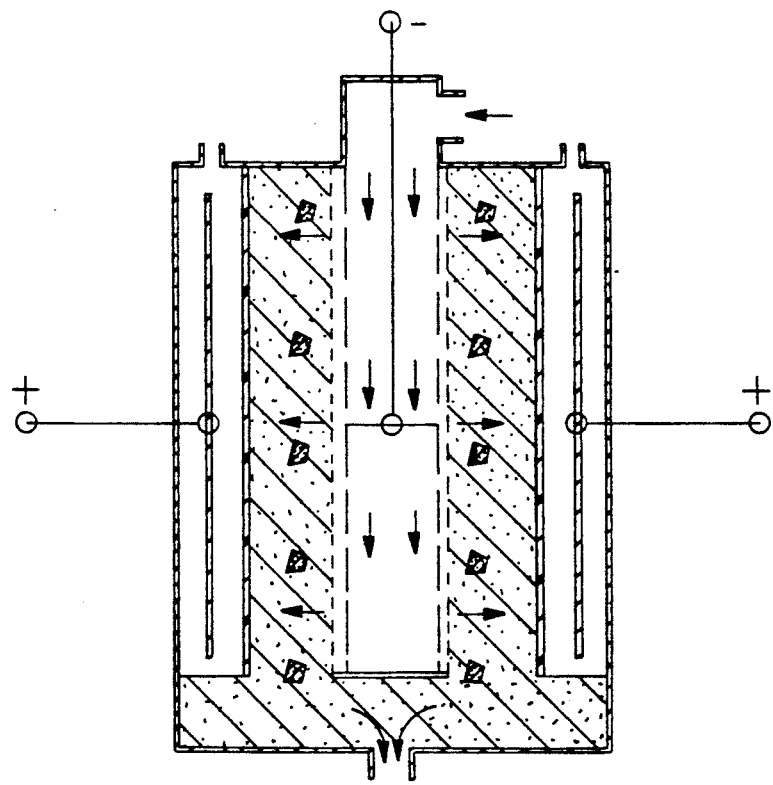
FIG. IB

REMOVAL OF METAL IONS FROM PROCESS WASTEWATERS

The present invention relates to a process for removing metal ions whose redox potential is on the positive side of $\epsilon_H = -800$ mV from process wastewaters. U.S. Pat. No. 3,755,114 discloses treating wastewaters which contain dissolved metal compounds and which for environmental reasons cannot just be discarded by electrochemical means to remove the metals. For this purpose, the process wastewaters are subjected to an electrochemical treatment in which the metal ions are reduced and deposited at the surface of a cathode immersed in the process wastewater. For industrial electrolyses, in particular of dilute metal salt solutions, the cathodes used preferably have large surface areas in order to achieve high space-time yields, low cell voltages and a correspondingly low power consumption. Cathodes with a large surface area are dumped bed cathodes, fluidized bed or fluid cathodes, rotating powder cathodes, carbon felt cathodes, plate stack cathodes and perforated materials. The unsatisfactory aspect of the processing techniques mentioned is that either the space-time yields are inadequate, necessitating high investment costs for the electrolysis cells, or the current yields are too low, which makes the operating costs disproportionately high.

Moreover, in most cases of the processing techniques mentioned it is very difficult to separate the metal from the cathode, making additional working-up steps necessary. These defects mean that in many cases, in particular as regards the metal ion residual concentrations demanded by the environmental authorities, it is impossible to work up process wastewaters economically by electrochemical techniques.

It is an object of the present invention to remove metal ions from process wastewaters with an electrically conducting cathodically polarized filter-aid layer in such a way as to obtain residual metal contents of $\leq 0.5$ ppm, preferably $\leq 0.1$ ppm, in the process wastewater with high space-time yields and minimal energy consumption.

We have found that this object is achieved according to the present invention by passing the metal ion-containing water through an electrically conducting cathodically polarized filter-aid layer whose potential is at least 50 mV more negative than the redox potential of the metal ions to be removed and periodically renewing the filter-aid layer at intervals of from 2 to 180 minutes by backwashing, classifying and precoating processes.

The electrically conducting material used for the filter-aid layers comprises metal granules corresponding to the metal ions to be removed, for example copper, zinc or cadmium granules, and/or carbon or carbon-containing materials such as activated carbons, activated carbon intermediates, anthracite, lignite, bituminous coal, coke, natural graphite or electrical graphite. The preferred material for the filter-aid layer is electrical graphite or natural graphite. Both electrical and natural graphite and the other carbon-containing materials should contain less than 0.005% by weight of metals or metal compounds of subgroups 5, 6 and 8 of the periodic table to prevent closing up of the filter-aid layer.

The size of the electrically conducting particles can range from 5 to 500 $\mu$m. The preferred particle size is from 30 to 200 $\mu$m to prevent diffusion impairment and establish optimum mass transfer conditions.

The filter-aid layer should be more than 0.3 mm deep in order to prevent any fouling or blinding of the liquid-permeable electrically conducting support underneath the filter-aid layer. On the other hand, the filter-aid layer should not be more than 10 mm deep to prevent the voltage drop in the filter-aid layer from causing hydrogen evolution to take place at the electrically conducting support for the filter-aid layer. Preference is given to filter-aid layers from 0.6 to 3 mm in depth.

The supports used for the filter-aid layer are electrically conducting, liquid-permeable materials which are constructed as fabrics or sinters in the form of filter plates or plugs. The pore diameter of the filter fabric or sinter can range from 30 to 300 $\mu$m, preferably from 60 to 120 $\mu$m.

The filter-aid layers are polarized via the electrically conducting, liquid-permeable support materials. The supports used are materials of low surface roughness which at a current density of 1 kA/m$^2$ have a hydrogen overvoltage of at least $\geq 400$ mV in order that the filter-aid layer may be polarized to the desired potential levels without hydrogen evolution. Suitable materials are for example silicon steels, copper, silver and graphite.

The process wastewater throughput through the filter-aid bed can range from 0.5 to 300 m$^3$/m$^2$.h. Throughputs of from 5 to 50 m$^3$/m$^2$.h are particularly advantageous. The pressure loss in the precoat under these throughputs should be within the range from 0.2 to 3 bar. The range from 0.4 to 1 bar has been found to be advantageous.

The current density for the cathodic polarization of the filter-aid layer can range from 0.1 to 10 kA/m$^2$. Current densities of from 0.5 to 3 kA/m$^2$ are preferred.

The anode materials used for the electrolysis cell are dimensionally stable materials having low oxygen overvoltages. Suitable anode materials with low oxygen overvoltages are for example titanium supports with electrically conducting interlayers of borides and/or carbides and/or silicides of subgroups IV to VI or tantalum and/or niobium, with or without platinum metal doping, the surface of which is doped with electrically conducting, non-stoichiometric mixed oxides of valve metals of subgroups IV to VI of the periodic table and metals or metal oxides of the platinum group or platinum metal compounds, eg. platinates. Preference is given to using mixed oxides of tantalum-iridium, tantalum-platinum and tantalum-rhodium and also to platinates of the Li$_{0.3}$Pt$_3$O$_4$ type. To enlarge the surface area the titanium supports should be surface-roughened or microporous.

The anodes are separated from the process wastewater and the cathodically polarized filter-aid layer by a diaphragm or a cation exchange membrane.

Suitable diaphragms are ceramic materials based on aluminum oxide and/or zirconium oxide or perfluorinated olefins which additionally contain ion-exchanging groups.

The cation exchange membranes used are preferably polymers based on perfluorinated olefins or copolymers of tetrafluoroethylene with unsaturated perfluorinated ethers or copolymers of styrene and divinylbenzene which as charge-carrying groups contain sulfonic acid and carboxyl groups or only sulfonic acid groups. Preference is given to using membranes which contain sulfonic acid groups only, since they are significantly more stable to entrapment of and fouling by multivalent cations.

The electrolytes used in the anode compartment are aqueous oxygen ion-containing mineral acids, for example sulfuric acid or phosphoric acid. Of particular advantage is aqueous 5–20% strength by weight sulfuric acid.

To reduce the metal concentration, the metal ion-containing process wastewater is passed through the filter-aid layer and the filter-aid layer support, and metal deposition will take place in the filter-aid layer down to a depth of 0.3 mm. It is therefore advantageous to use filter-aid layers not less than 0.5 mm in thickness in order to preclude the deposition of metal on the support for the filter-aid layer. The filter-aid layer should ideally be renewed every 4 to 20 minutes by backwashing, classifying and precoating processes in order to prevent excessive compaction of the filter-aid layer.

The metal ions can be removed from the process wastewater stream in a batchwise or continuous process. In the case of the continuous process, the desired residual concentration of metal ions in the water is determined by the current supply, the process wastewater throughput and the number of electrolysis cells connected in series. To monitor the removal of metals it has been found to be advantageous to measure the potential of the filter-aid layer against a reference electrode. Suitable reference electrodes are for example thalamide, silver/silver chloride and calomel electrodes. Using this technique it is possible for example to remove the ions of the following metals from process wastewaters: copper, silver, gold, arsenic, bismuth, cadmium, cobalt, chromium, iron, gallium, indium, germanium, molybdenum, nickel, lead, antimony, selenium, mercury, tellurium, thallium, tin and zinc.

The process of the present invention is particularly suitable for depleting the concentration of metal ions in process wastewaters down to residual levels of $\leq 0.1$ ppm. In the case of metals of subgroup 1 the use of the cathodically polarized filter-aid layer permits high space-time yields at current yields of $\geq 95\%$. The significantly higher current densities, compared with prior art metal removal cells, which can be up to 10 kA/m² of geometric surface area, lead to an appreciable saving in electrode surface and electrolysis cell volume. The metal obtained can be discharged from the electrolysis cell simply by backwashing. If carbon or a carbon-containing material is used for the filter-aid layer the metal can be separated therefrom chemically or by classification.

BRIEF DESCRIPTION OF THE DRAWINGS

In the drawing,

FIG. 1(a) is a schematic view the passage of metal ion-containing water through a vessel containing a polarized filter-aid layer; and FIG. 1(b) is a schematic view of the vessel as the filter-aid is being renewed.

EXAMPLE

A 10 l capacity glass vessel (1) as per FIG. a/b is fitted with a filter-aid layer support of V4A (4571) 300 mm in length and 50 mm in diameter (2). The mesh size of the filter-aid layer support is 100 μm. This filter-aid layer support is surrounded at a distance of ~20 mm by a concentric arrangement of six doped titanium anodes (3) 300 mm in length, 17 mm in width and 1.5 mm in depth. The titanium anodes are coated with an iridium-tantalum mixed oxide. Additionally, these anodes are separated from the process wastewater stream by cation exchange membrane tubes (4) 20 mm in diameter. These tubes contain as the auxiliary electrolyte an aqueous 10% strength by weight solution of sulfuric acid. The filter-aid layer (5) for the cathode comprises natural graphite granules from 20 to 500 μm in size.

To test the electrolysis cell for batch operation, the metal salt-containing process wastewater is passed through the filter-aid layer support to produce a precoat thereon ~2 mm in thickness from about 150 g of electrical graphite granules from 40 to 200 μm in size. To operate this cell the filter-aid layer support and the filter-aid layer are cathodically polarized with a current strength of 50 A or a current density of 0.97 kA/m², while the process wastewater is recirculated through the filter-aid layer. See FIG. (a). To check the end point of the metal removal process, the potential of the filter-aid layer is measured against a silver/silver chloride reference electrode.

Operating at $+28°$ C. with a throughput of 1200 l/h through the filter-aid layer and a pressure loss of 0.3 bar, the following results are obtained with the listed wastewaters:

| Wastewater type | Me $C_A$ ppm | Me $C_E$ ppm | Potential $C_A$ mV | Potential $C_E$ mV | Current yield % |
|---|---|---|---|---|---|
| Copper in H₂SO₄ 10% strength | 1000 | ~4.0 | ~~14 | ~90 | ~100.0 |
| Copper in H₂SO₄ 10% strength | 1000 | ~0.1 | ~~14 | ~450 | 98.5 |
| Silver in H₂SO₄ 5% strength | 840 | 3.0 | ~+200 | −50 | ~100.0 |
| Silver in H₂SO₄ 5% strength | 840 | <0.1 | ~+200 | ~450 | 98.6 |
| Cadmium in Na₂SO₄ 5% strength | 520 | 2.5 | ~−750 | ~1018 | 80 |
| Cadmium in Na₂SO₄ 5% strength | 520 | <0.1 | ~−750 | ~1085 | 75 |

During the run the filter-aid layer was periodically renewed every 8 minutes by backwashing, classifying and precoating processes.

In addition to the listed metals, using this electrolysis cell arrangement it is also possible to eliminate the metals bismuth, tin, zinc, nickel, mercury, arsenic, lead and molybdenum from weakly acidic waste-waters of pH 1.8–6, obtaining residual concentration for the metal ions of 0.5 ppm.

We claim:

1. A process for removing metal ions whose redox potential is on the positive side of $\epsilon_H = -800$ mV from process wastewaters, which comprises passing the metal ion-containing water through an electrically conducting cathodically polarized filter-aid layer whose potential is at least 50 mV more negative than the redox potential of the metal ions to be removed and periodically renewing the filter-aid layer at intervals of from 2 to 180 minutes by backwashing, classifying and precoating processes.

2. A process as claimed in claim 1, wherein the electrically conducting filter-aid layer used comprises metal granules corresponding to the metal ions to be removed, carbon or a carbon-containing material in a particle size of from 5 to 100 μm.

3. A process as claimed in claim 1, wherein the filter-aid layer comprises graphite and the graphite contains less than 0.05% by weight of metals or metal compounds of subgroups 5, 6 and 8 of the periodic table.

4. A process as claimed in claim 1, wherein the filter-aid layer is from 0.3 to 10 mm in depth.

5. A process as claimed in claim 1, wherein the filter-aid layer is situated on an electrically conducting support comprising a liquid-permeable sinter material or fabric.

6. A process as claimed in claim 1, wherein the electrically conducting filter-aid layer is contacted via a electrically conducting support which has a hydrogen overvoltage of $\geq 400$ mV at a current density of 1 kA/m$^2$.

7. A process as claimed in claim 1, wherein the pressure drop across the filter-aid layer is from 0.2 to 3 bar and the process wastewater throughput is from 1 to 300 m$^3$/m$^2$.h.

8. A process as claimed in claim 1, wherein the filter-aid layer is polarized with a current density of from 0.1 to 10 kA/m$^2$.

9. A process as claimed in claim 1, wherein the filter-aid layer is polarized against a wastewater-resistant anode superficially doped with a platinum metal or a platinum metal mixed oxide.

10. A process as claimed in claim 1, wherein the anode is separated from the process wastewater and the cathodically polarized filter-aid layer by a diaphragm or a cation exchange membrane.

11. A process as claimed in claim 1, wherein the process is carried out in a glass vessel containing a filter-aid layer support and an anode compartment separated from the filter-aid layer by a cation exchange membrane, wherein the anode compartment contains a dilute, oxygen ion-containing mineral acid.

12. A process as claimed in claim 1, wherein the metal ion-containing process wastewater is passed batchwise or continuously through the filter-aid layer until the final concentration of $\leq 0.5$ ppm is reached.

* * * * *